United States Patent [19]
Natori

[11] 3,863,519
[45] Feb. 4, 1975

[54] ROD-END BEARING ASSEMBLY FOR ACCELERATOR LINK MECHANISM

[75] Inventor: Sadaaki Natori, Toyota, Japan

[73] Assignee: Toyota Jidosha Kogyo Kabushiki Kaisha, Aichi-ken, Japan

[22] Filed: Mar. 22, 1973

[21] Appl. No.: 343,942

[30] Foreign Application Priority Data
  Mar. 24, 1972  Japan.............................. 47-29534
  Mar. 24, 1972  Japan........................ 47-34648[U]

[52] U.S. Cl.................................... 74/474, 74/513
[51] Int. Cl............................................... G05g 9/00
[58] Field of Search............ 74/513, 512, 474, 560, 74/482; 192/99 R; 403/316, 375, 380

[56] References Cited
UNITED STATES PATENTS
3,310,140  3/1967  Olnhausen...................... 74/474 X

*Primary Examiner*—Benjamin W. Wyche
*Assistant Examiner*—Frank H. McKenzie, Jr.
*Attorney, Agent, or Firm*—Stevens, Davis, Miller & Mosher

[57] ABSTRACT

A rod-end bearing assembly for accelerator link mechanism comprising a rotative shaft supported between vehicle body side and engine side, a first link means for causing the rotation of the rotative shaft and a second link means for transmitting the rotation of the rotative shaft to an engine carburetor throttle valve operating lever. The rotative shaft has one end supported in an engine side bracket and the other end is supported in the form of an rod-end bearing by an arm suspended from vehicle side bracket. The rod-end bearing of the rotative shaft is constituted by a holder and a ball head received in a holder cavity and kept against departure therefrom by a retainer received in a retainer hole or groove formed in the holder near the open end thereof. The retainer extending within the cavity engages with the side wall defining the retainer hole or groove and also with a stem portion of the ball head, and a neck integral with the ball head is so adapted that it will not touch the open end of the cavity. Thus, no forces tending to pry the ball head out of the cavity will be produced even when a movement of the rotative shaft in the axial direction or in a direction normal to the axial direction takes place.

3 Claims, 15 Drawing Figures

ROD-END BEARING ASSEMBLY FOR ACCELERATOR LINK MECHANISM

The present invention relates to rod-end bearing assemblies and, more particularly, to shaft-end bearing assemblies for supporting a rotative shaft for operating force transmission in an accelerator link mechanism for automotive vehicles.

The accelerator link mechanism for automotive vehicles consists of an accelerating pedal, cranks, connecting rod members or links and a rotative shaft. When the accelerating pedal is depressed, this action is transmitted as clockwise or counterclockwise torque to the rotative shaft through a link train, and the rotation of the rotative shaft is transmitted to a lever for operating a throttle valve of a carburetor secured to the engine body. The rotative shaft has its one end loosely received in a hole formed in a bracket and its other end supported in a rod-end bearing. The rod-end bearing consists of a holder provided to one end of the shaft and a ball head received in a cavity of the holder and secured to the lower end of an arm pivotally suspended from a stationary bracket. The ball head is usually held against departure from the holder by a U-shaped retainer with the opposite legs thereof received in respective grooves formed in the holder and extending in a tangential direction relative thereto and parallel to each other.

When the automotive vehicle collides head-on with another vehicle or with an object, the engine greatly swings back and forth. Also, when the engine is suddenly accelerated or suddenly decelerated, the engine swings not only back and forth but also in the lateral direction due to the reaction torque. The axial motion of the rotative shaft accompanying this motion of the engine is taken up by the pivotal motion of the pivotally suspended arm. However, when the displacement of the rotative shaft is too great, the ball head strikes the edge of the holder to produce forces tending to pry out the ball head. As a result, it is likely that the ball head pushes apart the legs of the retainer and gets out of the cavity of the holder. If this results, the throttle valve of the carburetor can no longer be operated by depressing the accelerator pedal.

The lateral reciprocal or revolving movement of the rotative shaft accompanying its motion in a direction normal to its axis will not cause the generation of forces tending to pry the ball head out of the holder since the ball head can freely turn within the holder. However, when back-and-forth motion and lateral motion of the engine concurrently take place, causing a movement of the rotative shaft consisting a component of movement in a direction parallel to the shaft axis and a component in normal direction thereto, the ball head is liable to get out of the holder.

In order to prevent this, it might be thought to increase the length of the pivotal arm. However, the arm length cannot be increased too much because the available space is limited. Also, it may be considered to provide diametrically opposite notches having a width corresponding to the maximum rotation of the rotative shaft lest a neck integral with the ball head should touch the open end of the holder cavity. However, if these notches are present the ball head which is retained in position by a retainer is likely to be disengaged from the holder.

A primary object of the invention is to provide a rod-end bearing assembly, which permits to securely and reliably support one end of the rotative shaft.

Another object of the invention is to provide a rod-end bearing assembly, which permits to securely and reliably support one end of the rotative shaft on the vehicle body side even when the rotative shaft undergoes great axial or lateral displacement.

A further object of the invention is to provide an rod-end bearing assembly, which can be sufficiently employed for supporting the rotative shaft of the accelerator link mechanism for automotive vehicles and subject to great axial and lateral motions.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

Figure 1:
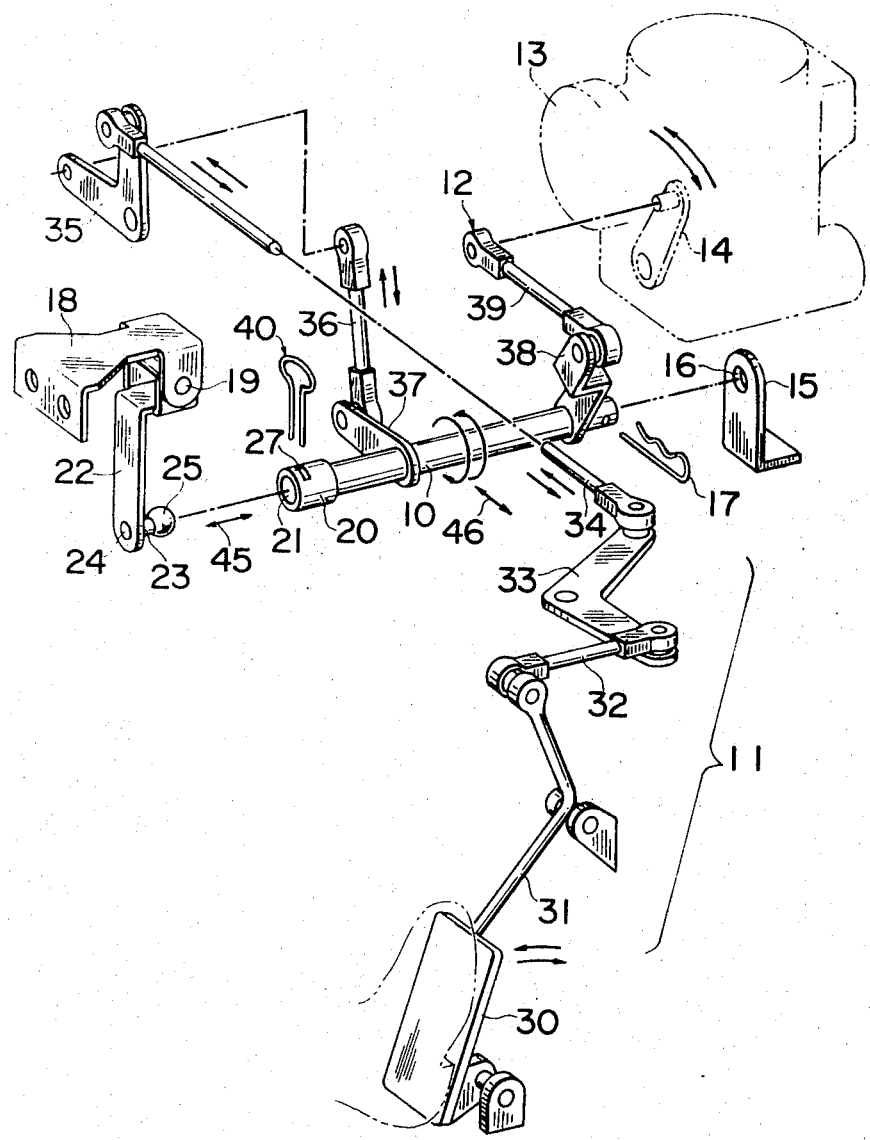
FIG. 1 is an exploded perspective view of an embodiment of the rod-end bearing assembly according to the invention applied to an accelerator link mechanism for an automotive vehicle.

Referring now to FIG. 1, there is shown an accelerator link mechanism, which comprises a rotative shaft 10, a first link train 11 for transmitting a suitable torque to the rotative shaft and a second link train 12 for transmitting the rotation of the rotative shaft 10 to a lever 14 for operating a throttle valve of an engine carburetor 13. One end of the rotative shaft 10 is loosely received in a bearing hole 16 formed in a bracket 15 secured to the engine, and it is retained in place by a retainer pin 17. The other end of the rotative shaft 10 is provided with a holder 20 having a cavity 21, which constitutes a rod-end bearing together with a ball head 25 extending from the free end of an arm 22 pivotally mounted on a pin 19 carried by a bracket 18 secured to the vehicle body, the ball head 25 being fitted in and held in position within the cavity 21. The holder 20 is formed near its free end with a transverse slit 27, through which a retainer 40 is inserted to hold the ball head 25 locked within the holder.

The first link train 11 comprises an accelerating pedal 30, links 31 and 32, a bellcrank 33, a link 34, a bellcrank 35, a link 36 and arm 37 secured to the rotative shaft 10. The second link train 12 comprises an arm 38 secured to the rotative shaft 10, a link 39 and a lever 14.

When the accelerating pedal 30 is depressed, the rotative shaft 10 is rotated in the clockwise direction in the Figure via the successive members 31 to 37 of the first link train 11, so that the aperture of a throttle valve (not shown) of the carburetor 13 is increased via the members 38, 39 and 14 of the second link train 12. On the other hand, when the pedal 30 is released the rotative shaft 10 is rotated in the counterclockwise direction or in the direction of closing the throttle valve.

It will be understood that since the rotative shaft 10 is supported at one end in the bearing hole and at the other end in the rod-end bearing as mentioned above, the rotation of the rotative shaft itself caused by operating the pedal is not impeded. Also, the reciprocal movement or vibration of the rotative shaft 10 in the axial direction as indicated at 45 and in a direction normal thereto due to various transient running conditions of the vehicle can be taken up by the rod-end bearing.

Figure 2:
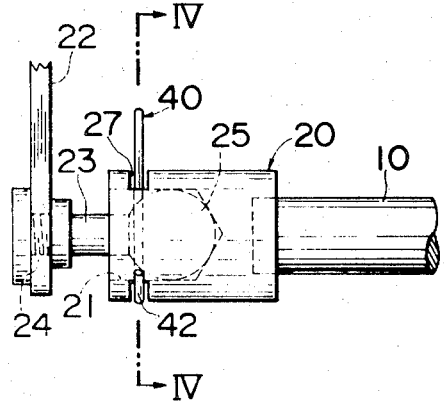
FIG. 2 is a side view, to an enlarged scale, showing a rotative shaft support portion of the embodiment of FIG. 1.
Figure 3:
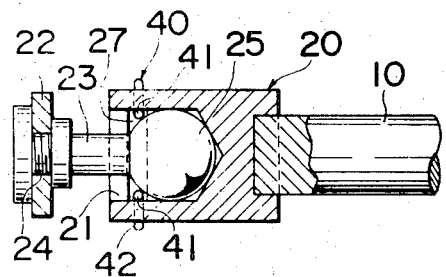
FIG. 3 is a plan view, partly in section, of the portion of FIG. 2.

FIGS. 2 and 3 show the afore-mentioned rod-end bearing assembly to an enlarged scale in side view in FIG. 2 and in plan view, partly in section, in FIG. 3. As is shown, the ball head 25 is fitted in and held in position within the cavity 21 of the holder 20, and it has its neck 23 which is integral with it and penetrates and is fixed in position relative to a hole 24 formed in the arm 22 near the lower end thereof. The holder 20 is formed near its open end with a transverse slit 27, which extends in a transversal direction noraml to the holder axis and has a rectangular form with the long side substantially equal to the diametrical dimension of the cavity 21. A retainer 40 as shown in FIG. 1 is inserted through this slit 27. As is most clearly seen from FIGS. 3 and 4, the retainer 40 has a hairpin-like form, and its opposite legs 41 extend in the vicinity of the junction of the ball head 25 and the neck 23 (or in the vicinity of a stem 26 of the ball head 25). The legs 41 have their end portions extending outside of slit 27 bent toward the holder to fix the retainer 40 in position. With this construction, the ball head 25 will not get out of the holder 20 when the rotative shaft 10 is rotated or when it is vibrated back and forth or left to right. In particular, though the legs 41 of the retainer 40 is outwardly pushed by the ball head 25 when the rotative shaft 10 is moved back and forth (in the axial direction 45), the spreading of the retainer is prevented by the side walls 47 and 48 on opposite sides of the slit 27 and the ball head 25 is reliably retained within the cavity 21. The retainer 20 need to have such a configuration that it is held against deformation by the afore-mentioned opposite walls 47 and 48, but it is possible to use a retainer which is contact with only one of the opposite side walls, for instance side wall 47 (for instance one that will be described hereinafter in connection with FIG. 12).

Figure 5:
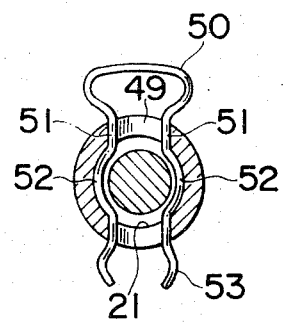
FIG. 5 is a sectional view showing a modification using a different retainer from that shown in FIG. 4.

FIG. 5 shows a modification of the preceding embodiment. In this modification, the slit 49 has a rectangular form with the long side made smaller than the diametrical dimension of the cavity 21, and the legs 51 of the retainer 50 respectively have oppositely curved portions 52. End portions 53 of the legs extending outside of the slit are bent oppositely to each other.

Figure 6:
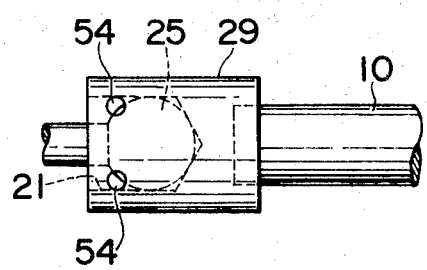
FIG. 6 is a plan view showing a holder different from that shown in FIG. 2.

FIG. 6 shows another modification, in which the holder 29 is formed near its open end with two small parallel transverse holes instead of the afore-mentioned slit having a rectangular form. Opposite legs of a retainer (not shown) are inserted in these holes to keep the ball head in position.

Figure 7:
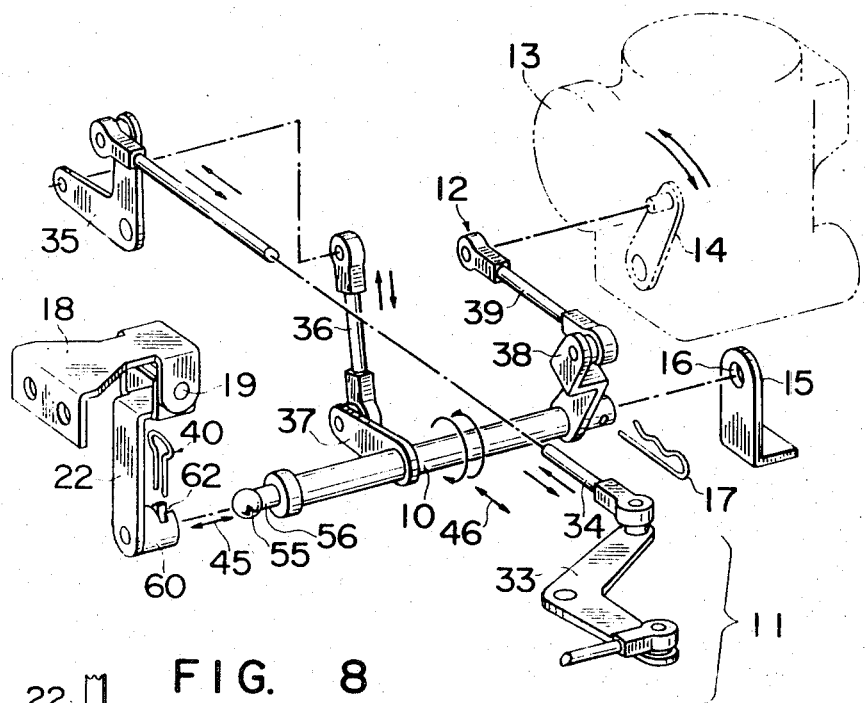
FIG. 7 is a view similar to FIG. 1 but showing a second embodiment of the invention using a holder different from that in the embodiment of FIGS. 1 to 4.

FIG. 7 shows another embodiment of the rod-end bearing assembly, in which a holder 60 having a cavity extends from the free end of the arm 22 pivotally suspended from the bracket 18 secured to the vehicle body and a ball head 55 is provided on the side of the rotative shaft 10. In this embodiment, such considerations are paid that the neck 56 integral with the ball head will not touch the inner edge of the holder 60 in whatever movement of the rotative shaft 10.

Figure 4:
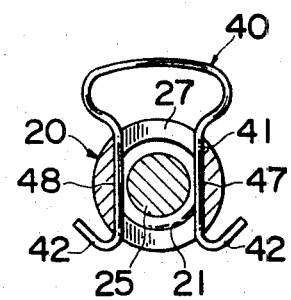
FIG. 4 is a section taken along line IV—IV in FIG. 2.
Figure 8:
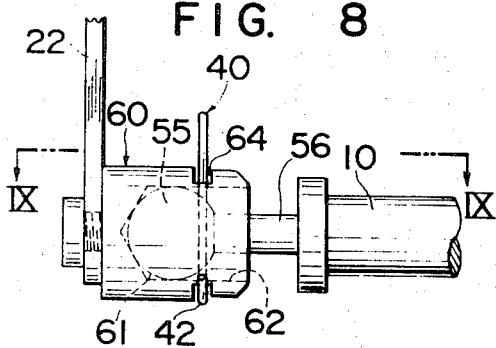
FIG. 8 is a side view, to an enlarged scale, showing a rotative shaft support portion of the embodiment of FIG. 7.
Figure 9:
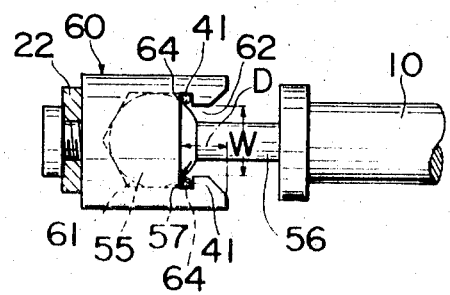
FIG. 9 is a plan view taken along line IX—IX in FIG. 8 and viewed in the direction of arrows.

FIGS. 8 and 9 show, to an enlarged scale, the rod-end bearing assembly shown in FIG. 1. As is shown, the neck 56 integral with the ball head 55 is secured to one end of the rotative shaft 10. The ball 55 is fitted in and held in position within the cavity 61 of the holder 60, which is secured to the free end of the pivotably suspended arm 22. The holder 60 is formed with a peripheral notch 62 continuous to the open end of the holder 60 and reaching a stem portion 57 of the ball head in plan view. The notch 62 has a transversal dimension or width (W) sufficient to permit free motion of the neck 56 relative to the holder 60 with the pivotal motion of the arm 22. Also, the opposite corners of the holder on opposite sides of the notch is chamfered as shown in FIG. 9. The notch 62 terminates in the retainer insertion slit 64, which is made wider than the non-chamfered portion of the notch. A retainer 40 of a configuration similar to that shown in FIG. 4 is inserted through the slit 64 to keep the ball head 55 within the holder. Since the holder 60 is formed with the chamfered notch 62 continuous to its open end, even when the rotative shaft 10 moves in the axial direction the neck 56 will not touch the inner edge of the holder 60, giving rise to no such force that tends to pry out the ball head, so that the ball head can be securely kept in position within the holder cavity.

Figure 10:
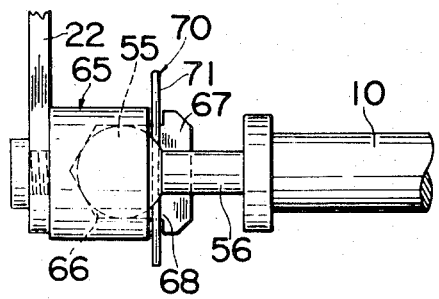
FIGS. 10 and 11 are views respectively similar to FIGS. 8 and 9 but showing a modification of the FIG. 7 embodiment using a different holder.
Figure 12:
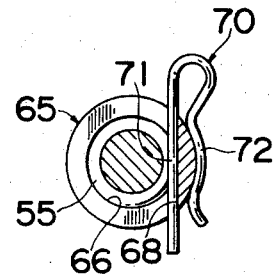
FIG. 12 is a section taken along line XII—XII in FIG. 11 and viewed in the direction of arrows.
Figure 11:
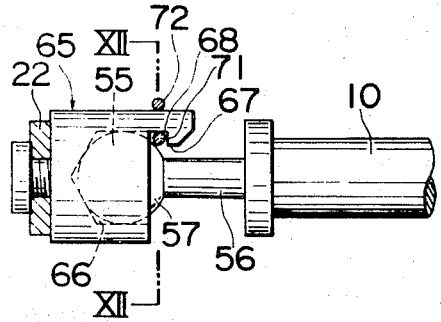

FIGS. 10 to 12 show a modification of the preceding embodiment. In this modification, a portion of the holder 65 adjacent the open end thereof is cut away except for a portion that corresponds to one side wall on one side of the notch in the preceding embodiment of FIGS. 8 and 9. More particularly, a wall portion of the holder 65 adjacent the opening of the cavity 66 is removed except for a portion 67 constituting one of side walls which are not touched by the neck 56 with the pivotal motion of the arm 22. A retainer groove 68 is formed in the stem portion of the side wall portion 67. A clip-like retainer 70 as shown in FIG. 12 is received in the groove 68. More particularly, one of the legs, namely leg 71, of the retainer 70 is received in the groove 68, and the other leg 72 engages with the outer periphery 69 of the holder.

Figure 13:
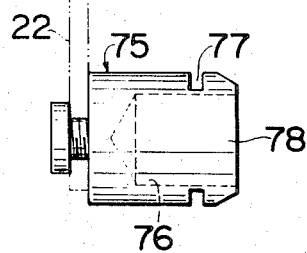
FIGS. 13, 14 and 15 are views respectively corresponding to FIGS. 10, 11 and 12 but showing a further modification using a further different holder.
Figure 15:
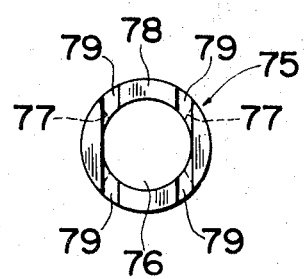
Figure 14:
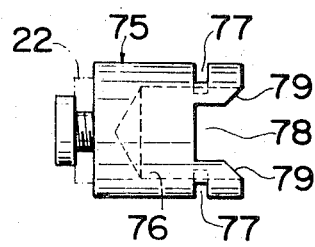

FIGS. 13 to 15 show a modification of the holder shown in FIG. 8. In this modification, the holder 75 having cavity 76 is formed near its open end with a slanted retainer insertion slit 77. The holder 75 is also formed with a notch 78 reaching a stem portion of the ball head in plan view. The opposite corners of the holder on opposite sides of the notch 78 are chamfered as indicated at 79. By so doing, the neck integral with the ball head will not touch the chamfered corners even when back-and-forth or lateral movement of the rotative shaft takes place.

As has been described, according to the invention it is possible to prevent the neck integral with the ball head from striking the open end of the holder and also prevent the spreading of the retainer, so that the ball head can be securely held within the cavity by the retainer and will never get out of the cavity even when concurrent axial and lateral motions of the rotative shaft take place. Thus, the construction according to the invention is suitable for use as the rod-end bearing of the rotative shaft of an automotive accelerator link mechanism.

What we claim is:

1. A rod-end bearing assembly for the accelerator link mechanism of automotive vehicles comprising:
    a shaft;
    means mounting said shaft for movement in the axial direction and in a direction normal to the axis;
    a first arm on said shaft;
    an accelerating pedal;
    first link means connecting said first arm to said pedal;
    a second arm on said shaft and a lever to operate a throttle valve of an engine carburetor;
    second link means connecting said second arm to said lever;
    said shaft having a ball head at an end thereof toward the side of the vehicle body with a narrower neck member connecting said ball head to said shaft;
    a bracket secured to the vehicle body having a pivotable arm mounted on a pin held by said bracket;
    a holder for said ball head fixed on one side to the lower end of said pivotable arm and having an opening on the other side for the insertion of said ball head;
    said holder having a cavity therein connected by a bore to said opening on said other side of said holder;
    said bore having a slightly larger diameter than the outer diameter of said ball head and said cavity with connecting bore being spaced within said holder to enable said ball head and part of said neck member to be inserted within said holder;
    a portion extending longitudinally through said holder from the tip of the opening to a depth at which the juncture of the neck member and said ball head is approximately placed when said ball head is inserted into said cavity;
    a groove formed in said holder at the inner edge of said portion, said groove having a width equal to or narrower than the bore of said cavity, and
    a check pin in said groove whereby said ball head is prevented from escaping from said cavity.

2. A rod-end bearing assembly for the accelerator link mechanism of automotive vehicles comprising;
    a shaft;
    means mounting said shaft for movement in the axial direction and in a direction normal to the axis;
    a first arm on said shaft;
    an accelerating pedal;
    first link means connecting said first arm to said pedal;
    a second arm on said shaft and a lever to operate a throttle valve of an engine carburetor;
    second link means connecting said second arm to said lever;
    said shaft having a ball head at an end thereof toward the side of the vehicle body with a narrower neck member connecting saiad ball head to said shaft;
    a bracket secured to the vehicle body having a pivotable arm mounted on a pin held by said bracket;
    a holder for said ball head fixed on one side to the lower end of said pivotable arm and having an opening on the other side for the insertion of said ball head;
    said holder having a cavity therein connected by a bore to said opening on said other side of said holder;
    said bore having a slightly larger diameter than the outer diameter of said ball head and said cavity with connecting bore being spaced within said holder to enable said ball head and part of said neck member to be inserted within said holder;
    portions extending longitudinally through said holder from the tip of the opening to a depth at which the juncture of the neck member and said ball head is approximately placed when said ball head is inserted into said cavity and defining a notch therebetween;
    said notch having a width narrower than the bore of said cavity but wider than that of said neck member;
    a groove formed in said holder at the inner edge of said portions, said groove extending perpendicular to said portions on either side of said notch and having a width equal to or narrower than the bore of said cavity, and
    a check pin in said groove whereby said ball head is prevented from escaping from said cavity.

3. A rod-end bearing assembly as defined by claim 2, wherein a tapered surface is formed at the tip surface of the said holder extending radially toward the inside of said notch.

* * * * *